United States Patent
Hsu (10) Patent No.: US 7,936,857 B2
(45) Date of Patent: May 3, 2011

(54) PHASE SELECTOR FOR DATA TRANSMITTING DEVICE

(75) Inventor: Cheng-Chung Hsu, Chang-Hua Hsien (TW)

(73) Assignee: Realtek Semiconductor Corp., Science Park, HsinChu (TW)

(*) Notice: Subject to any disclaimer, the term of this patent is extended or adjusted under 35 U.S.C. 154(b) by 952 days.

(21) Appl. No.: 11/737,758

(22) Filed: Apr. 20, 2007

(65) Prior Publication Data

US 2007/0283184 A1 Dec. 6, 2007

(30) Foreign Application Priority Data

Apr. 26, 2006 (TW) .............................. 95114931 A (51) Int. Cl.
*H04L 7/00* (2006.01)
(52) U.S. Cl. ........................................... 375/371
(58) Field of Classification Search .............. 327/156, 327/144, 12, 231, 205; 375/376, 375; 714/724, 714/814; 341/100
See application file for complete search history.

(56) References Cited

U.S. PATENT DOCUMENTS

| 4,039,960 | A | * | 8/1977 | Clark ............................ 327/144 |
| 5,046,075 | A | | 9/1991 | Kraemer |
| 5,126,587 | A | | 6/1992 | Preller |
| 5,646,968 | A | * | 7/1997 | Kovacs et al. ................. 375/375 |
| 5,977,837 | A | | 11/1999 | Byrn |
| 6,486,721 | B2 | * | 11/2002 | Greenstreet et al. .......... 327/211 |
| 6,496,043 | B1 | * | 12/2002 | Moss et al. ....................... 327/12 |
| 6,621,312 | B2 | * | 9/2003 | Tang et al. ..................... 327/156 |
| 6,710,726 | B2 | * | 3/2004 | Kim et al. ....................... 341/100 |
| 6,861,886 | B1 | * | 3/2005 | Ludden et al. ................ 327/156 |
| 7,134,060 | B2 | * | 11/2006 | Tanaka et al. ................. 714/724 |
| 7,423,919 | B2 | * | 9/2008 | Lin ................................ 365/194 |
| 7,512,872 | B2 | * | 3/2009 | Awaji et al. ................... 714/814 |
| 7,644,296 | B1 | * | 1/2010 | Burney ......................... 713/401 |
| 2004/0227553 | A1 | * | 11/2004 | Muranishi ..................... 327/231 |
| 2005/0008110 | A1 | | 1/2005 | Lake |
| 2007/0121775 | A1 | * | 5/2007 | Chen et al. .................... 375/376 |
| 2008/0074162 | A1 | * | 3/2008 | Hsu ................................ 327/205 |

FOREIGN PATENT DOCUMENTS

| EP | 1 172 962 A2 | 1/2002 |
| EP | 1199837 A2 | 4/2002 |
| JP | 57-48841 A | 3/1982 |
| WO | WO 02/39652 A1 | 5/2002 |

* cited by examiner

*Primary Examiner* — Chieh M Fan
*Assistant Examiner* — Jaison Joseph
(74) *Attorney, Agent, or Firm* — Winston Hsu; Scott Margo (57) ABSTRACT

A phase selector is disclosed. The phase selector is utilized for outputting an output clock to a flip-flop according to an input data signal latched by the flip-flop. The phase selector includes: a clock phase adjustor, for adjusting the delay of an input clock to generate a first clock and a second clock, wherein the clock phases of the first clock and the second clock are different; a phase detector, for detecting phase relation between the input data signal and the first clock to generate a detecting signal; a decision circuit, coupled to the phase detector, for generating a selecting signal according to the detecting signal; and a selection circuit, coupled to the decision circuit, for selecting the input clock or the second clock to generate the output clock to the flip-flop according to the selecting signal.

20 Claims, 7 Drawing Sheets

| $S_{W1}$ | $S_{W2}$ | $S_{DIS}=\overline{S_{W1}+S_{W2}}$ | $S_{EN}$ | $S_R=S_{DIS}+S_{EN}$ | $C_{D1}$ | $S_C=C_{D1}\cdot S_R$ |
|---|---|---|---|---|---|---|
| 0 | 0 | 1 | 0 | 1 | 0 | 0 |
|   |   |   |   |   | 1 | 0 |
| 0 | 0 | 1 | 0 | 1 | 0 | 0 |
|   |   |   |   |   | 1 | 1 |
| 0 | 1 | 0 | 0 | 0 | 0 | 0 |
|   |   |   |   |   | 1 | 0 |
| 0 | 1 | 0 | 0 | 0 | 0 | 0 |
|   |   |   |   |   | 1 | 0 |
| 1 | 0 | 0 | 0 | 0 | 0 | 0 |
|   |   |   |   |   | 1 | 0 |
| 1 | 0 | 0 | 0 | 0 | 0 | 0 |
|   |   |   |   |   | 1 | 0 |
| 1 | 1 | 0 | 0 | 0 | 0 | 0 |
|   |   |   |   |   | 1 | 0 |
| 1 | 1 | 0 | 0 | 0 | 0 | 0 |
|   |   |   |   |   | 1 | 0 |
| 0 | 0 | 1 | 1 | 1 | 0 | 0 |
|   |   |   |   |   | 1 | 1 |
| 0 | 0 | 1 | 1 | 1 | 0 | 0 |
|   |   |   |   |   | 1 | 1 |
| 0 | 1 | 0 | 1 | 1 | 0 | 0 |
|   |   |   |   |   | 1 | 1 |
| 0 | 1 | 0 | 1 | 1 | 0 | 0 |
|   |   |   |   |   | 1 | 1 |
| 1 | 0 | 0 | 1 | 1 | 0 | 0 |
|   |   |   |   |   | 1 | 1 |
| 1 | 0 | 0 | 1 | 1 | 0 | 0 |
|   |   |   |   |   | 1 | 1 |
| 1 | 1 | 0 | 1 | 1 | 0 | 0 |
|   |   |   |   |   | 1 | 1 |
| 1 | 1 | 0 | 1 | 1 | 0 | 0 |
|   |   |   |   |   | 1 | 1 |

Fig. 7

PHASE SELECTOR FOR DATA TRANSMITTING DEVICE

BACKGROUND OF THE INVENTION

1. Field of the Invention

The present invention relates to a phase selector, and more particularly, to a phase selector with the functionality of deciding a phase of an output clock to trigger a flip-flop by comparing phases of an input data signal and an input clock.

2. Description of the Prior Art

In digital circuits, clock signals are essential reference signals for accessing digital data. Typically, latch time for accessing digital data in digital circuits is determined using either rising edge or falling edge triggers. In some cases, even though two different sub-circuits in a circuit system utilize exactly the same clock source, clocks and digital data transmitted to the sub-circuits may be asynchronous due to transmission delay or noise interference.

Figure 1:
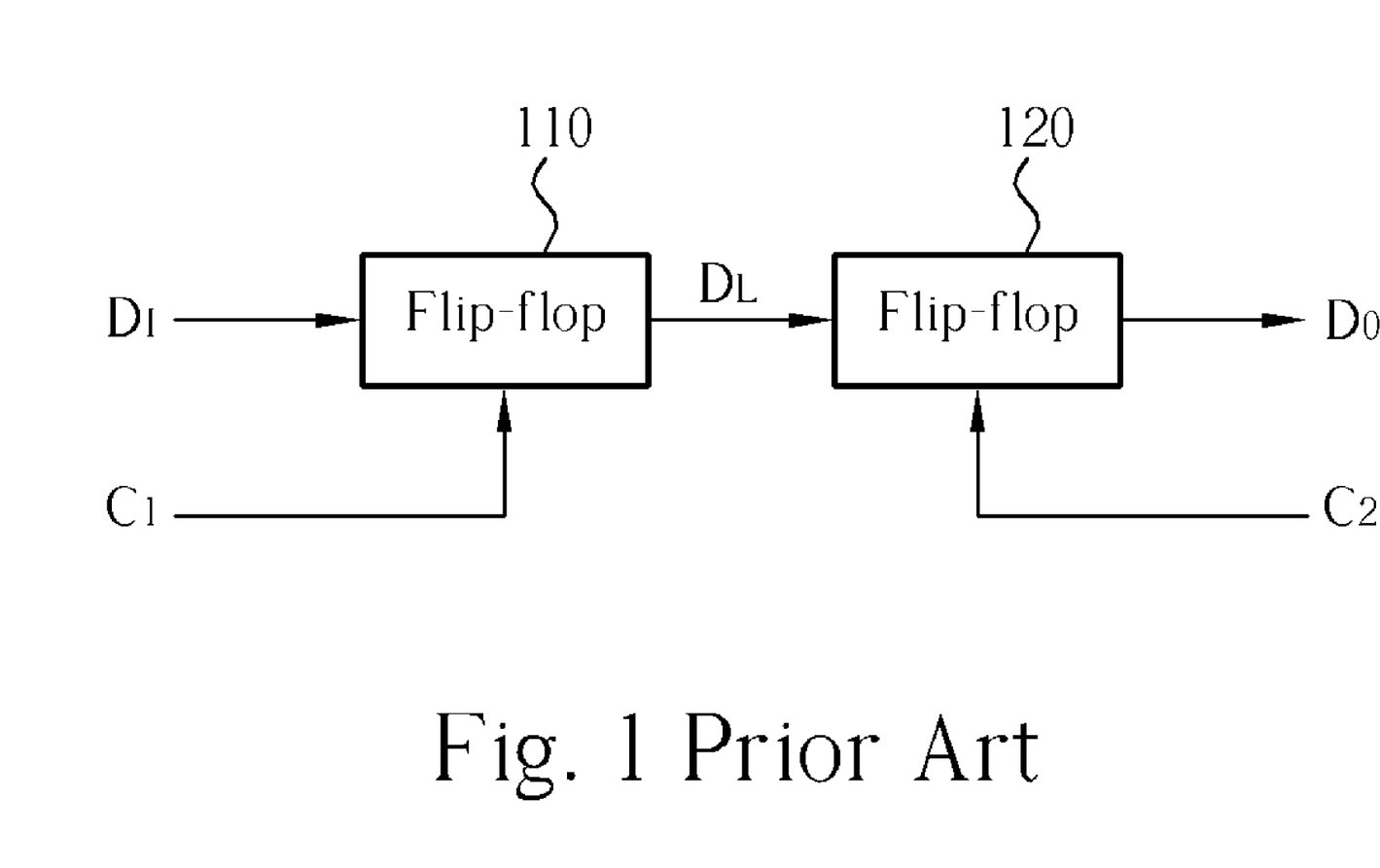
FIG. 1 is a schematic diagram illustrating digital data transmitted between two flip-flops according to the prior art.
Figure 2:
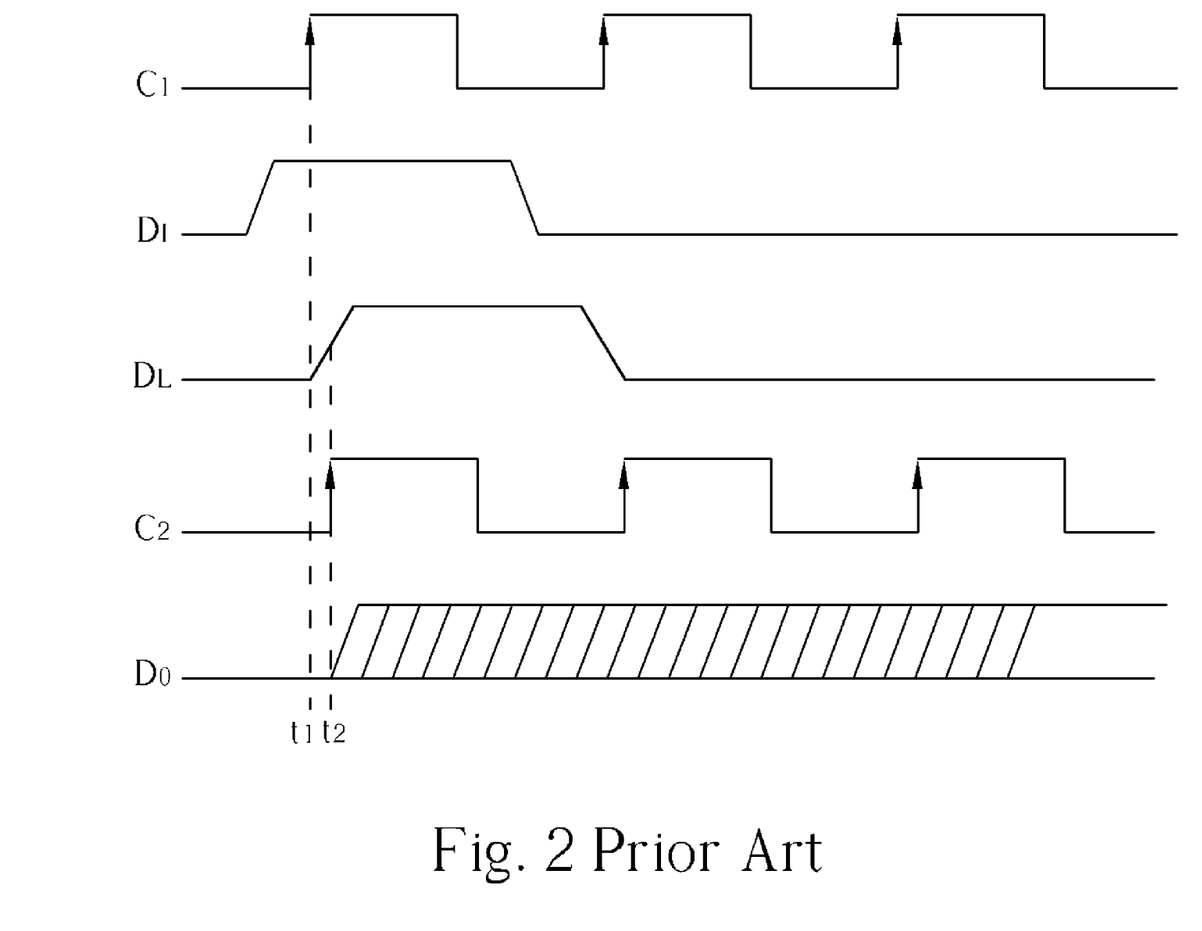
FIG. 2 is a timing diagram illustrating clocks and digital data in FIG. 1.

Take a transmitting device comprising two flip-flops as an example herein. Please refer to FIG. 1 and FIG. 2. FIG. 1 is a schematic diagram illustrating digital data transmitted between two flip-flops 110 and 120. FIG. 2 is a timing diagram illustrating clocks and digital data in FIG. 1. An input data signal $D_1$ and a clock $C_1$ are used herein as inputs to the flip-flop 110, having waveforms and timing relation shown in FIG. 2. Assume that both flip-flops 110 and 120 are rising edge triggered, thus the input data signal $D_1$ will be latched at $t_1$, the flip-flop 110 will output latch data $D_L$ to the flip-flop 120, and the latch data $D_L$ will have a transition from "0" to "1" from $t_1$, as shown in FIG. 2. Clocks $C_1$ and $C_2$ respectively for the two flip-flops 110 and 120 are asynchronous. Therefore, if a rising edge trigger of the clock $C_2$ happens at $t_2$ during the period when the latch data $D_L$ is changing from "0" to "1" as shown in FIG. 2, latch errors will be induced in the flip-flop 120, resulting in errors in digital data transmission.

SUMMARY OF THE INVENTION

It is therefore one of the objectives of the present invention to provide a phase selector and a related clock selection method for generating an appropriate reference clock in data transmitting device, thus improving the accuracy of reading/writing data.

According to one embodiment of the present invention, the present invention discloses a phase selector, for outputting an output clock to a flip-flop according to an input data signal latched by the flip-flop, the phase selector comprising: a clock phase adjustor, for adjusting the delay of an input clock to generate a first clock and a second clock, wherein the clock phases of the first clock and the second clock are different; a phase detector, for detecting phase relation between the input data signal and the first clock to generate a detecting signal; a decision circuit, coupled to the phase detector, for generating a selecting signal according to the detecting signal; and a selection circuit, coupled to the decision circuit, for selecting the input clock or the second clock to generate the output clock to the flip-flop according to the selecting signal.

According to another embodiment of the present invention, the present invention discloses a data transmitting device, comprising: a first flip-flop, for latching an input data signal to output a data signal according to a first clock; a second flip-flop, coupled to the first flip-flop, for latching the data signal to output an output data signal according to an output clock; and a phase selector, coupled to the first flip-flop and the second flip-flop, for generating the output clock to the second flip-flop according to phase relation between the data signal and a second clock; wherein the frequency of the output clock is substantially equal to the frequency of the second clock.

These and other objectives of the present invention will no doubt become obvious to those of ordinary skill in the art after reading the following detailed description of the preferred embodiment that is illustrated in the various figures and drawings.

DETAILED DESCRIPTION

Figure 3:
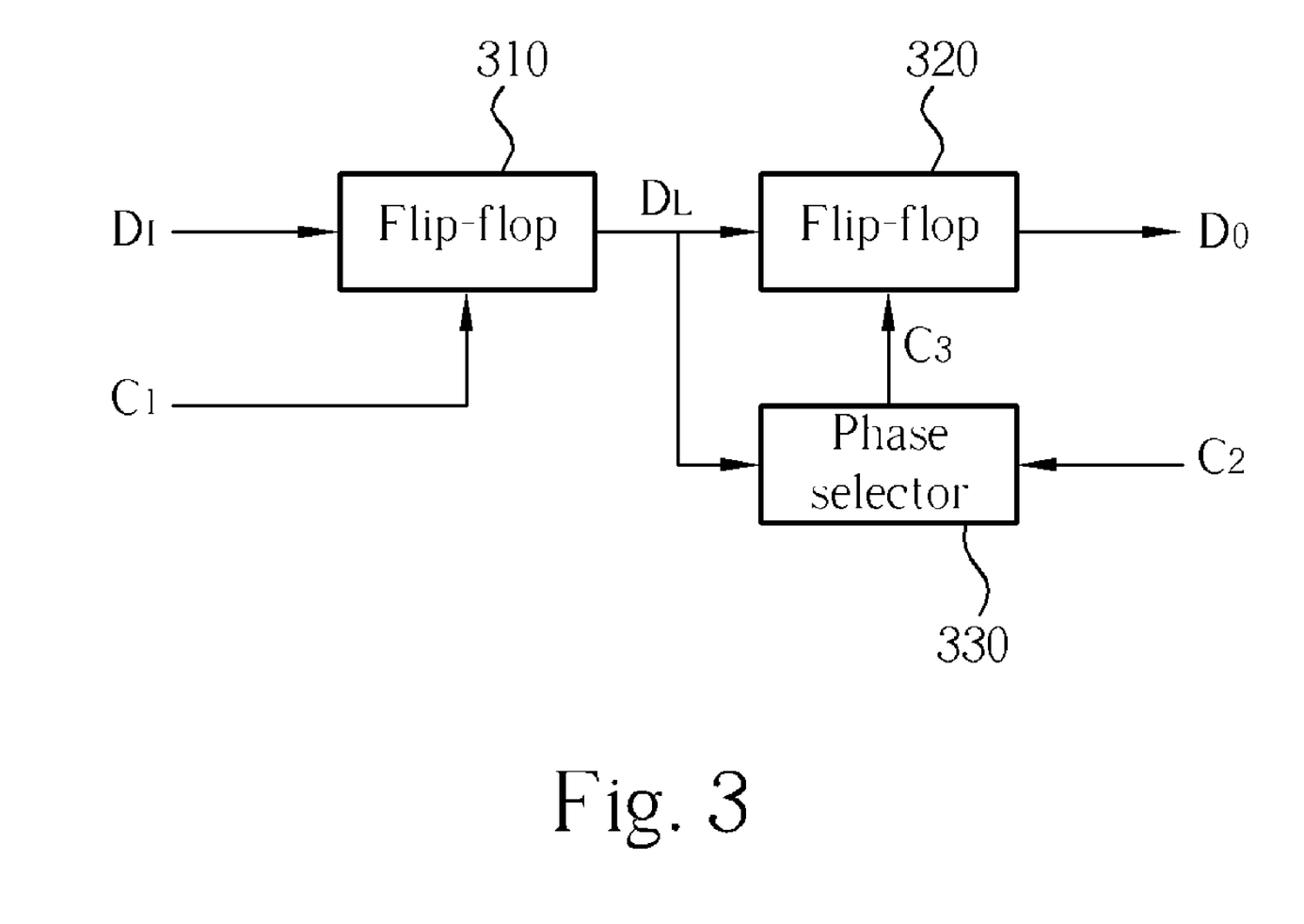
FIG. 3 is a schematic diagram illustrating a data transmitting device with a phase selector.
Figure 4:
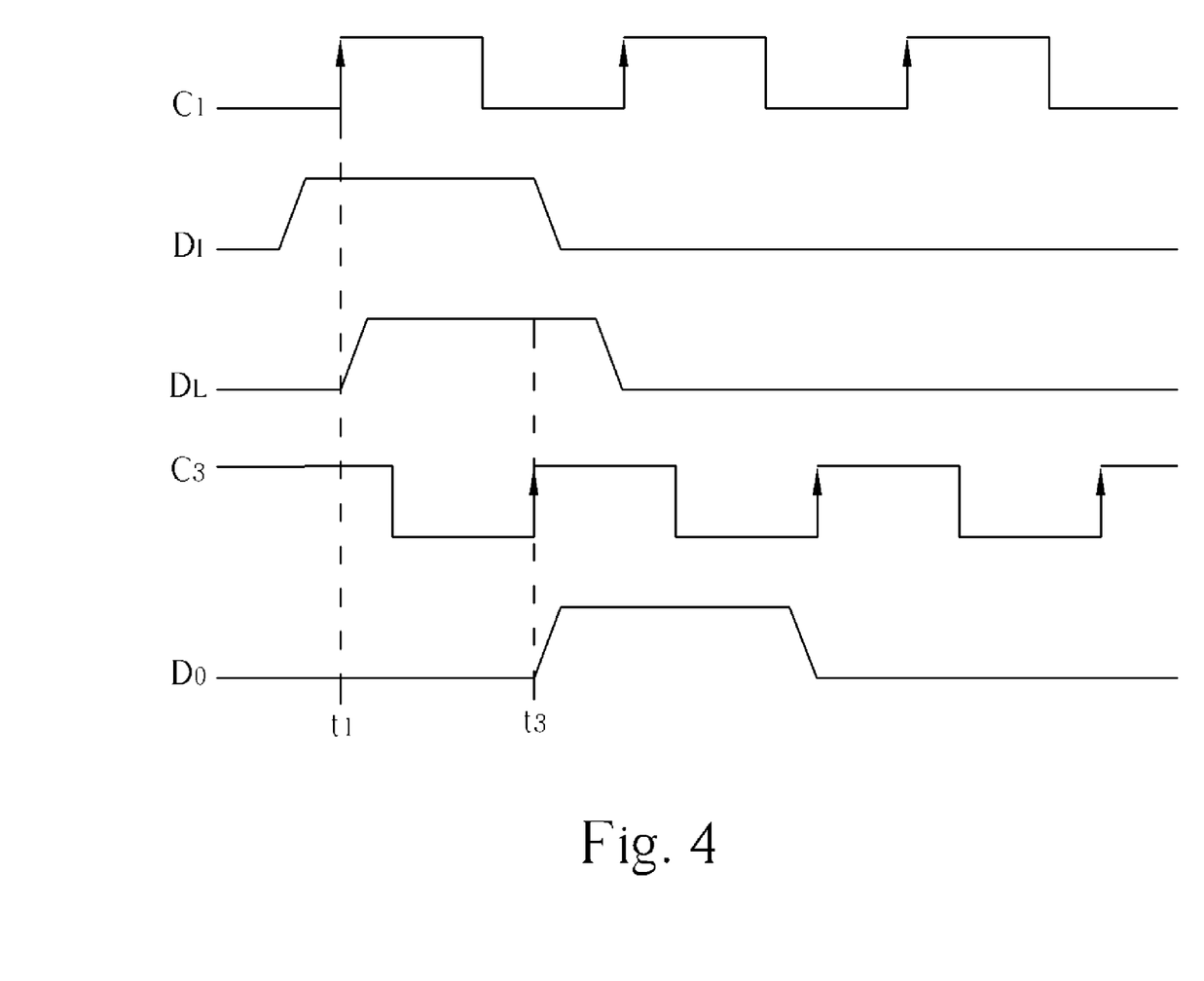
FIG. 4 is a timing diagram illustrating clocks and digital data in FIG. 3.

Please refer to FIG. 3 and FIG. 4. FIG. 3 is a schematic diagram illustrating a data transmitting device with a phase selector 330 of the present invention. FIG. 4 is a timing diagram illustrating clocks and digital data in FIG. 3. As shown in FIG. 3, the phase selector 330 determines whether a phase of a clock $C_2$ needs to be delayed to generate a delay clock $C_3$ according to a latch data $D_L$. Therefore, the delay clock $C_3$ with a relatively delayed phase can be used to latch bit values of the latch data $D_L$ accurately. For example, in FIG. 4, the phase selector 330 delays the clock $C_2$ for a half-period, i.e. 180 degrees of phase. A rising edge trigger of the delay clock $C_3$ occurs at $t_3$ for a flip-flop 320 to latch the latch data $D_L$. Distinct from the clock $C_2$ with no delay (FIG. 2), the delay clock $C_3$ with a relatively delayed phase (FIG. 4) can latch bit values of the latch data $D_L$ accurately. In practical embodiments, the delay amount applied to the clock $C_2$ can be programmable by circuit designers. In other words, the clock $C_2$ can be delayed for a delay amount other than a half-period if appropriate. Accordingly, in one embodiment of the present invention, the flip-flop 310 is positioned in an analog signal domain, and the flip-flop 320 is positioned in a digital signal domain. In such a case, a signal $D_1$ is outputted from an analog circuit, and a signal $D_0$ is outputted to a digital circuit. In other embodiments, the flip-flop 310 can be positioned in a digital signal domain, and the flip-flop 320 can be positioned in an analog signal domain. In such a case, the signal $D_1$ is outputted from a digital circuit, and the signal $D_0$ is outputted to an analog circuit. Please note that the two above examples are not meant to be a limitation of the present invention.

Figure 5:
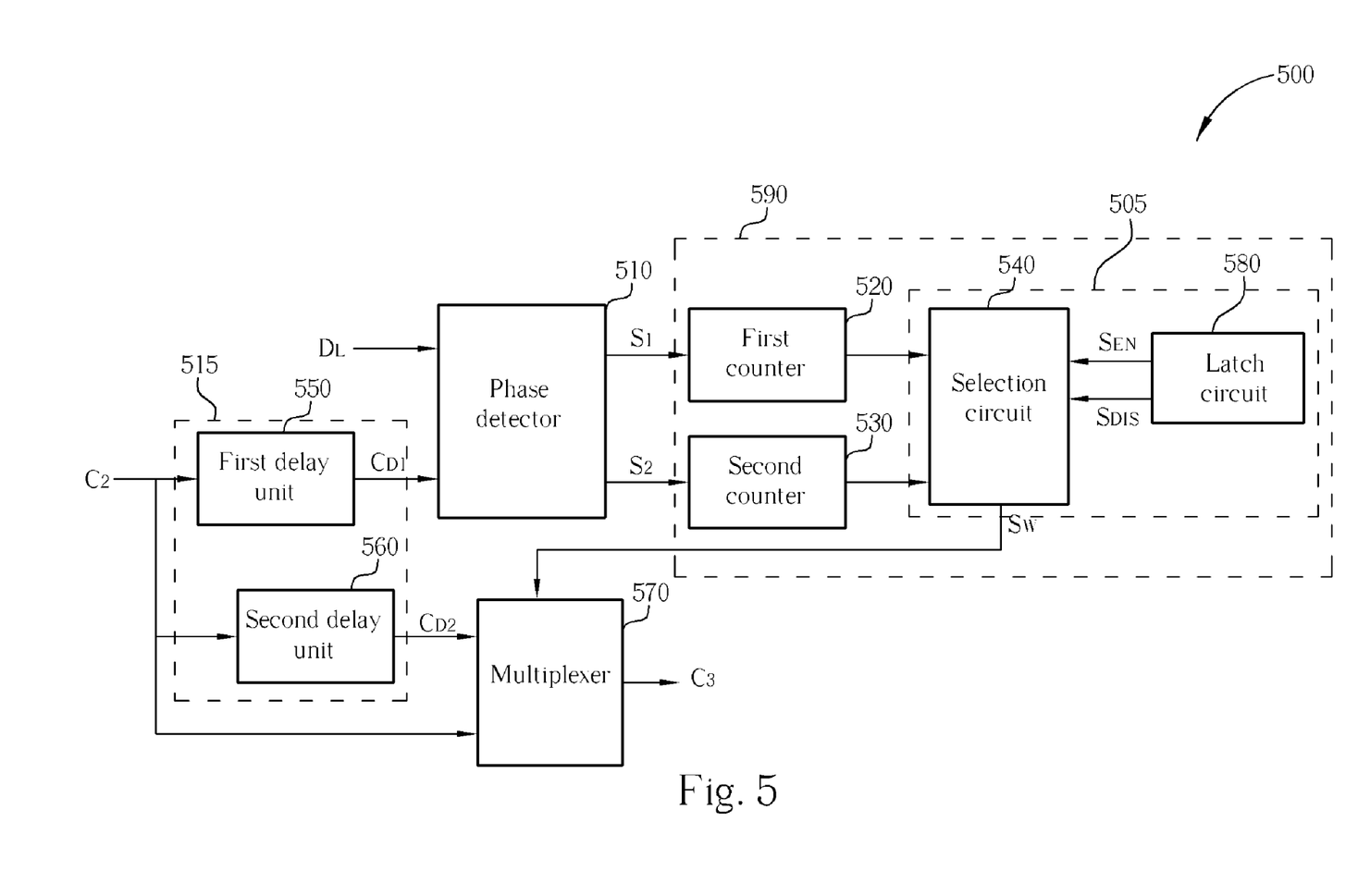
FIG. 5 is a schematic diagram illustrating an embodiment of a phase selector of the present invention.

FIG. 5 is a schematic diagram illustrating an embodiment of a phase selector 500 of the present invention. The phase selector 500 comprises a clock phase adjustor 515, a phase detector 510, a decision circuit 590, and a selection circuit, such as a multiplexer 570. The clock phase adjustor 515 comprises a first delay unit 550 and a second delay unit 560. The decision circuit 590 comprises a first counter 520, a second counter 530, and a control circuit 505. The control circuit 505 comprises a selection circuit 540 and a latch circuit 580.

The first delay unit 550 delays an input clock $C_2$ for some degree of phase delay to generate a first delay clock $C_{D1}$.

Because the phase detector 510 detects that a phase of an input data signal $D_L$ lags behind that of the first delay clock $C_{D1}$, a detecting signal $S_1$ remains at a logic level "0", and another detecting signal $S_2$ is a continuous square wave. If the phase of the input data signal $D_L$ leads that of the first delay clock $C_{D1}$, the detecting signal $S_1$ is a continuous square wave, and the detecting signal $S_2$ remains at the logic level "0". The selection circuit 540 decides whether a selecting signal $S_W$ is output to switch the multiplexer 570 according to the detecting signals $S_1$ and $S_2$. In one preferred embodiment that can prevent an erroneous switching operation of the multiplexer 570, the decision circuit 590 receives the detecting signals $S_1$ and $S_2$ via the first and second counters 520 and 530 respectively and thus outputs the selecting signal $S_W$; and the second delay unit 560 delays the input clock $C_2$ for some degree of phase delay to generate a second delay clock $C_{D2}$. The multiplexer 570 then selects the input clock $C_2$ or the second delay clock $C_{D2}$ to be an output clock $C_3$ according to the selecting signal $S_W$. In other words, the selecting signal $S_W$ for controlling the multiplexer 570 is decided according to phase relation between the input data signal $D_L$ and the first delay clock $C_{D1}$. When the phase of the input data signal $D_L$ leads that of the first delay clock $C_{D1}$, the multiplexer 570 selects the input clock $C_2$ as the output clock $C_3$. When the phase of the input data signal $D_L$ lags behind that of the first delay clock $C_{D1}$, however, the multiplexer 570 selects the second delay clock $C_{D2}$ as the output clock $C_3$.

Moreover, after the selection circuit 540 sends the selecting signal $S_W$ to switch the multiplexer 570, the latch circuit 580 will send a disable signal $S_{DIS}$ to the selection circuit 540. The disable signal $S_{DIS}$ thus stops the selection circuit 540 from switching the multiplexer 570, thereby avoiding system instability due to frequent switching operations. After the selection circuit 540 is stopped for an appropriate period of time, the latch circuit 580 will send an enable signal $S_{EN}$ to restart the selection circuit 540.

Figure 6:
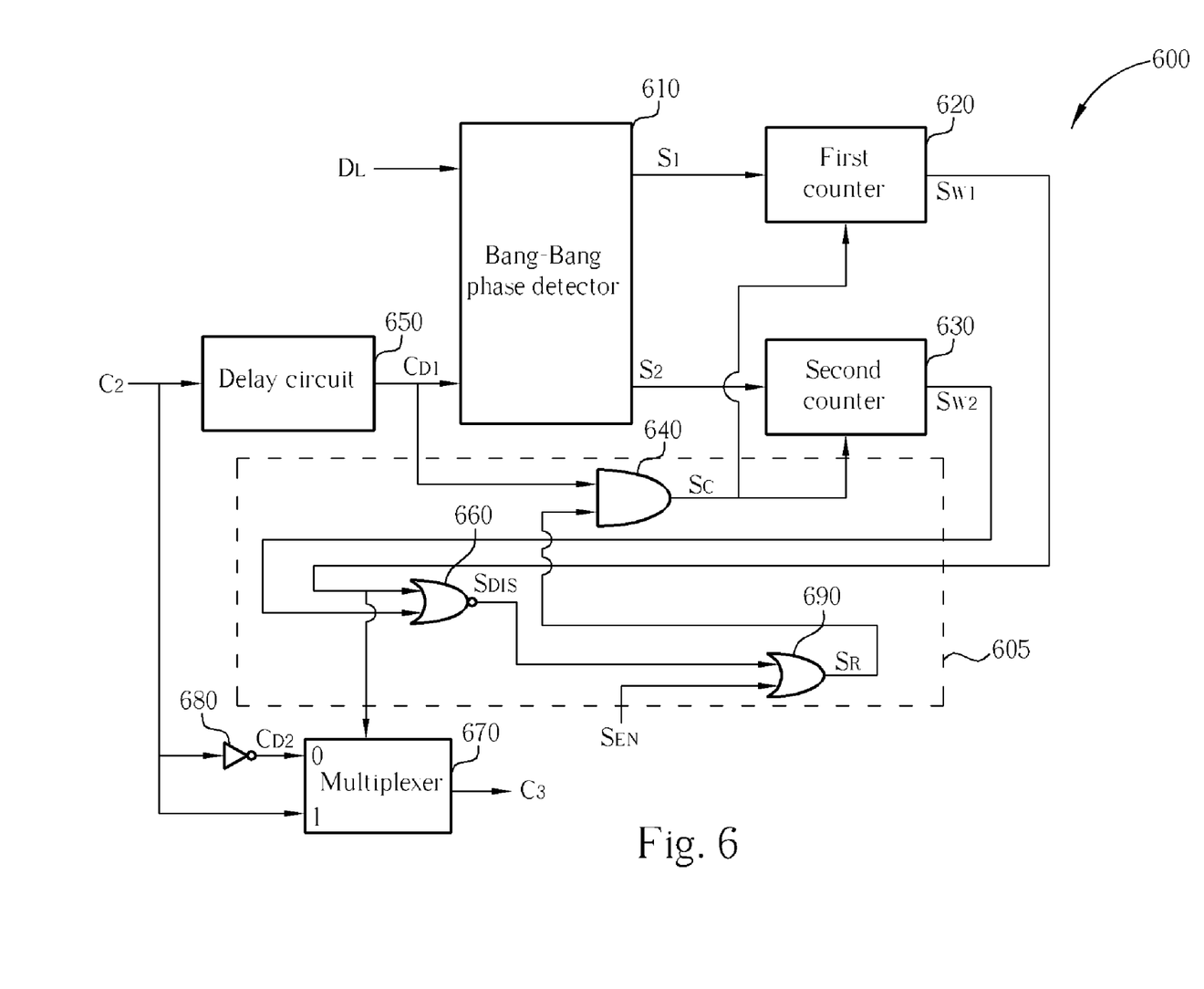
FIG. 6 is a schematic diagram illustrating the phase selector in FIG. 5 in detail.

FIG. 6 is a schematic diagram illustrating the phase selector in FIG. 5 in detail. As shown in FIG. 6, the phase selector 600 comprises a Bang-Bang phase detector 610, a first counter 620, a second counter 630, an AND gate 640, a delay circuit 650, a NOR gate 660, a multiplexer 670, a NOT gate 680, and an OR gate 690. The AND gate 640, the NOR gate 660, and the OR gate 690 form a control circuit 605. The delay circuit 650 delays an input clock $C_2$ for a quarter-period, i.e. 90 degrees of phase, to generate a first delay clock $C_{D1}$. The NOT gate 680 inverts the input clock $C_2$ to generate a second delay clock $C_{D2}$. In other words, the NOT gate 680 delays the input clock $C_2$ for 180 degrees of phase. The second delay clock $C_{D2}$ is thus sent to the multiplexer 670. If a phase of an input data signal $D_L$ leads that of the first delay clock $C_{D1}$, a detecting signal $S_1$ is a continuous square wave, and another detecting signal $S_2$ remains at a level "0". Moreover, when a square wave number (i.e. a pulse number) of the detecting signal $S_1$ counted by the first counter 620 reaches a threshold value, the phase of the input data signal $D_L$ will lead that of the first delay clock $C_{D1}$. Therefore, the first counter 620 outputs a first selecting signal $S_{W1}$ at a logical level "1". Because the detecting signal $S_2$ remains at the level "0", a square wave number of the detecting signal $S_2$ counted by the second counter 630 is zero. Thus, the second counter 630 outputs a second selecting signal $S_{W2}$ at a logical level "0". In such a case, the multiplexer 670 selects the input clock $C_2$ as an output clock $C_3$. Otherwise, the multiplexer 670 selects the second delay clock $C_{D2}$ as the output clock $C_3$. The first and second selecting signals $S_{W1}$ and $S_{W2}$ are input into the NOR gate 660 to generate a disable signal $S_{DIS}$. The disable signal $S_{DIS}$ and an enable signal $S_{EN}$ are input into the OR gate 690 to generate a reset signal $S_R$. Further, the reset signal $S_R$ and the first delay clock $C_{D1}$ are input into the AND gate 640 to generate a control signal $S_C$ for controlling the first and second counters 620 and 630. After Boolean calculation, the relation between the control signal $S_C$ and other signals can be represented as follows:

$$S_C = C_{D1}[S_{EN} + (S_{W1} + S_{W2})'].$$

Figure 7:
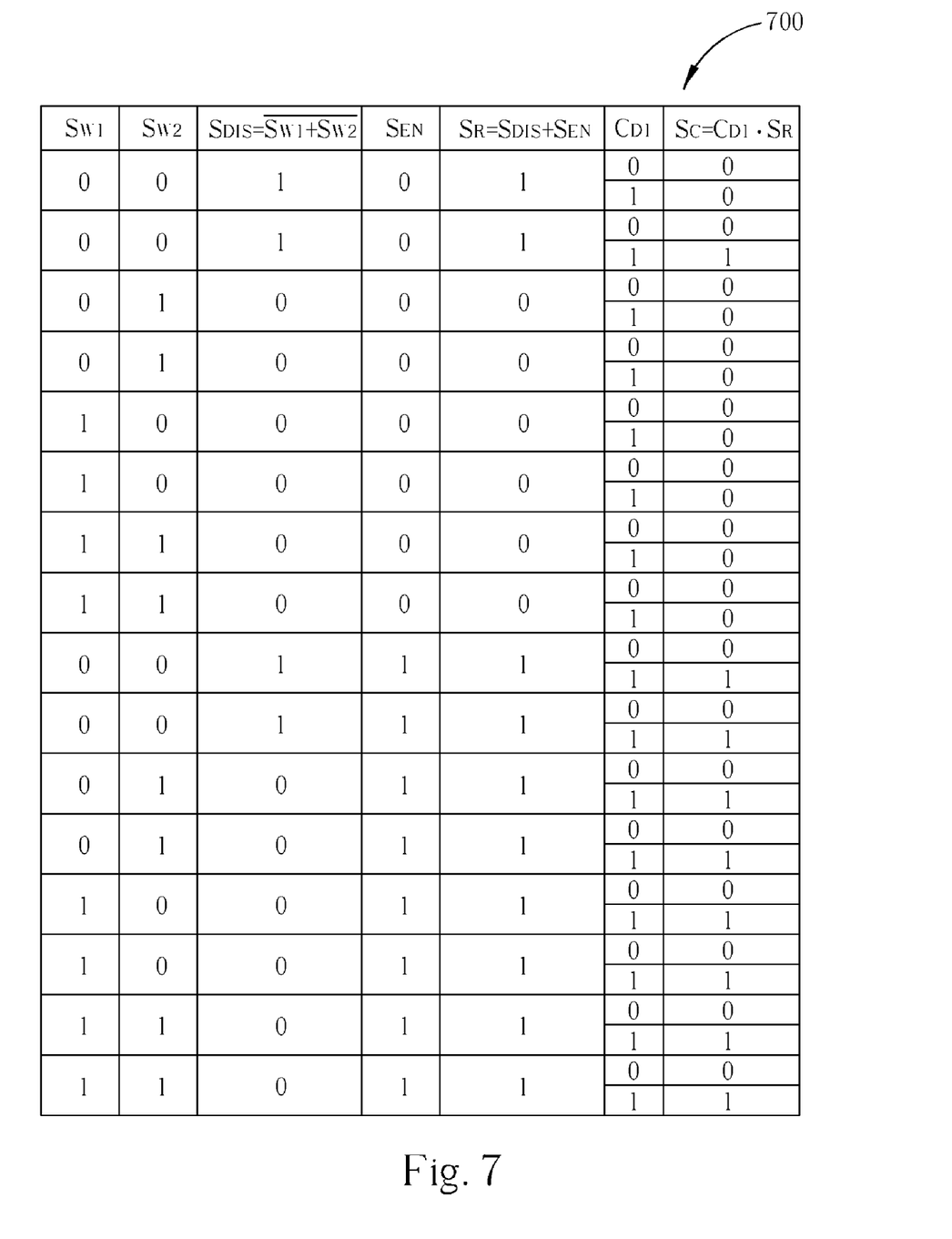
FIG. 7 is a truth table of related signals in FIG. 6.

FIG. 7 is a truth table 700 of the first selecting signal $S_{W1}$, the second selecting signal $S_{W2}$, the disable signal $S_{DIS}$, the enable signal $S_{EN}$, the reset signal $S_R$, the first delay clock $C_{D1}$, and the control signal $S_C$. As shown in FIG. 7, when square wave numbers counted by the first and second counters 620 and 630 are below the threshold value, the first and second selecting signals $S_{W1}$ and $S_{W2}$ are both logically "0". Meanwhile, the disable signal $S_{DIS}$ is "1", thus the reset signal $S_R$ is certain to be "1". Because the first delay clock $C_{D1}$ is a clock signal, the control signal $S_C$ is also a clock signal serving as a reference clock for the first and second counters 620 and 630. In other words, the first and second counters 620 and 630 continue to count the square wave numbers. When either square wave number reaches the threshold value, the corresponding selecting signal (i.e. the first selecting signal $S_{W1}$ or the second selecting signal $S_{W2}$) changes to be logically "1". The disable signal $S_{DIS}$ thus becomes logically "0". Meanwhile, if the enable signal $S_{EN}$ is not available, i.e. logically "0", the reset signal $S_R$ becomes logically "0", and the control signal $S_C$ also becomes logically "0". Therefore, the reference clock for the first and second counters 620 and 630 is "0", so the first and second counters 620 and 630 stop counting the square wave numbers. Additionally, the counters act as memories to store the results of the selecting signals $S_{W1}$ and $S_{W2}$. When the enable signal $S_{EN}$ is available, i.e. logically "1", the reset signal $S_R$ becomes logically "1", and the control signal $S_C$ is a clock signal again. The counters are reset to "0" at rising edges of the enable signal $S_{EN}$. In the above described way, the control circuit 605 formed by the NOR gate 660, the OR gate 690, and the AND gate 640 is utilized to avoid system instability due to frequent switching operations of the output clock $C_3$.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A phase selector, for outputting an output clock to a flip-flop according to an input data signal latched by the flip-flop, the phase selector comprising:
   a clock phase adjustor, for adjusting the delay of an input clock to generate a first clock and a second clock, wherein the clock phases of the first clock and the second clock are different;
   a phase detector, for detecting phase relation between the input data signal and the first clock to generate a detecting signal;
   a decision circuit, coupled to the phase detector, for generating a selecting signal according to the detecting signal; and
   a selection circuit, coupled to the decision circuit, for selecting the input clock or the second clock to generate the output clock to the flip-flop according to the selecting signal.

2. The phase selector of claim 1, wherein the phase detector is a Bang-Bang phase detector.

3. The phase selector of claim 1, wherein the detecting signal comprises a first detecting signal and a second detecting signal, and the decision circuit comprises:
- a first counter, for receiving the first detecting signal and counting pulses of the first detecting signal to generate a first count number; and
- a second counter, for receiving the second detecting signal and counting pulses of the second detecting signal to generate a second count number.

4. The phase selector of claim 3, wherein the decision circuit comprises:
- a control circuit, for outputting the selecting signal according to the first and second count numbers.

5. The phase selector of claim 1, wherein the decision circuit comprises:
- a latch circuit, for generating a disable signal to stop the selection circuit from selecting the input clock or the second clock to generate the output clock according to the selecting signal.

6. The phase selector of claim 1, wherein the clock phase adjustor comprises:
- a first delay unit, for delaying the input clock for a first delay time to generate the first clock; and
- a second delay unit, for delaying the input clock for a second delay time to generate the second clock.

7. The phase selector of claim 6, wherein the first delay time is a quarter-period of the input clock, and the second delay time is a half-period of the input clock.

8. The phase selector of claim 6, wherein the second delay unit is an inverter.

9. The phase selector of claim 1, wherein a phase difference between the second clock and the output clock corresponds to the phase relation between the data signal and the first clock.

10. The phase selector of claim 1, wherein the input data signal is outputted by a second flip-flop, and the flip-flop and the second flip-flop are positioned in different signal domains.

11. The phase selector of claim 10, wherein the flip-flop is positioned in an analog signal domain, and the second flip-flop is positioned in a digital signal domain.

12. A data transmitting device, comprising:
- a first flip-flop, for latching an input data signal to output a data signal according to a first clock;
- a second flip-flop, coupled to the first flip-flop, for latching the data signal to output an output data signal according to an output clock; and
- a phase selector, coupled to the first flip-flop and the second flip-flop, for generating the output clock to the second flip-flop according to phase relation between the data signal and a second clock;
- wherein the frequency of the output clock is substantially equal to the frequency of the second clock.

13. The device of claim 12, wherein the output clock has a phase different to that of the second clock.

14. The device of claim 13, wherein the phase difference between the output clock and the second clock is substantially equal to 180 degrees.

15. The device of claim 12, wherein the phase selector comprises:
- a phase detector, for detecting the phase relation between the data signal and the second clock to generate a detecting signal;
- a decision circuit, for generating a selecting signal according to the detecting signal; and
- a selection circuit, for selecting the second clock or a delay signal of the second clock to be the output clock.

16. The device of claim 15, wherein the phase detector is a Bang-Bang phase detector.

17. The device of claim 15, wherein the decision circuit comprises:
- a latch circuit, for generating a disable signal to stop the selection circuit from selecting the second clock or the delay signal of the second clock to generate the output clock.

18. The device of claim 12, wherein the first flip-flop and the second flip-flop are positioned in different signal domains.

19. The device of claim 18, wherein the first flip-flop is positioned in an analog signal domain, and the second flip-flop is positioned in a digital signal domain.

20. The device of claim 18, wherein the first flip-flop is positioned in a digital signal domain, and the second flip-flop is positioned in an analog signal domain.

* * * * *